United States Patent
Lee et al.

(10) Patent No.: US 7,734,080 B2
(45) Date of Patent: Jun. 8, 2010

(54) METHOD AND DEVICE FOR MEASURING PULMONARY NODULE VOLUME USING DUAL-ENERGY SUBSTRACTION IMAGE

(75) Inventors: Sooyeul Lee, Daejeon (KR); Jeong Won Lee, Daejeon (KR); Seunghwan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 855 days.

(21) Appl. No.: 11/633,175

(22) Filed: Dec. 4, 2006

(65) Prior Publication Data
US 2007/0133854 A1    Jun. 14, 2007

(30) Foreign Application Priority Data
Dec. 8, 2005   (KR) .................... 10-2005-0120026
May 10, 2006   (KR) .................... 10-2006-0042013

(51) Int. Cl.
*G06K 9/00*   (2006.01)
*G06K 9/36*   (2006.01)
*G06K 9/32*   (2006.01)

(52) U.S. Cl. .................... 382/132; 382/286; 382/300

(58) Field of Classification Search .................... None
See application file for complete search history.

(56) References Cited

U.S. PATENT DOCUMENTS

| | | | |
|---|---|---|---|
| 4,792,900 A | 12/1988 | Sones et al. | |
| 6,205,348 B1 * | 3/2001 | Giger et al. | 600/407 |
| 6,609,021 B1 | 8/2003 | Fan et al. | |
| 6,898,303 B2 | 5/2005 | Armato, III et al. | |
| 6,822,743 B2 | 8/2005 | Bansal et al. | |
| 2004/0114726 A1 * | 6/2004 | Lee et al. | 378/207 |
| 2005/0100208 A1 | 5/2005 | Suzuki et al. | |

FOREIGN PATENT DOCUMENTS

KR   10-2005-0028464   3/2005

* cited by examiner

*Primary Examiner*—Charles Kim
(74) *Attorney, Agent, or Firm*—Ladas & Parry LLP (57) ABSTRACT

A method and a device for measuring a pulmonary nodule volume using a dual-energy subtraction image are provided. The method includes: (a) obtaining a dual-energy subtraction image of a chest; (b) setting a specific region including a pulmonary nodule region in the obtained dual-energy subtraction image; (c) interpolating a gray level trend of a region surrounding the pulmonary nodule region into the pulmonary nodule region using a fitting function; and (d) measuring the pulmonary nodule volume by subtracting the interpolation result from the gray level data of the pulmonary nodule region. Accordingly, when it is desired to measure the pulmonary nodule volume using the dual-energy subtraction image, information on the thickness of the pulmonary nodule is obtained from the characteristic of the dual-energy subtraction image, and the pulmonary nodule volume is accurately measured by correcting errors at the border of the pulmonary nodule region using the fitting function.

10 Claims, 6 Drawing Sheets

METHOD AND DEVICE FOR MEASURING PULMONARY NODULE VOLUME USING DUAL-ENERGY SUBSTRACTION IMAGE

CROSS-REFERENCE TO RELATED PATENT APPLICATION

This application claims the benefit of Korean Patent Application No. 10-2005-0120026, filed on Dec. 8, 2005, and 10-2006-0042013, filed on May 10, 2006, in the Korean Intellectual Property Office, the disclosure of which is incorporated herein in its entirety by reference.

BACKGROUND OF THE INVENTION

1. Field of the Invention

The present invention relates to a method and a device for measuring pulmonary nodule volume using a dual-energy subtraction image.

2. Description of the Related Art

Lung cancer is the most common cancer and the leading cause of cancer deaths around the world. More than one million three hundred thousand people die of lung cancer around the world every year. In South Korea, more than twelve thousand people have died of lung cancer in 2002, and the death rate from lung cancer has been reported to be the highest of all. A pulmonary nodule is commonly observed on a chest radiograph and may be an inflammatory granuloma, benign tumor, or malignant tumor (lung cancer). Accordingly, it is important to determine whether the lesion is benign or malignant in addition to detecting the pulmonary nodule for early lung cancer diagnosis and rapid curative action. However, it is difficult even for medical experts to determine whether a pulmonary nodule is benign or malignant. The diagnostic accuracy of a pulmonary nodule using a computed tomography (CT) is about ⅔. Accordingly, a biopsy is commonly used to determine whether a pulmonary nodule is benign or malignant.

In general, a solitary pulmonary nodule is a round or oval, sharply defined lung lesion and is not accompanied with atelectasis or pneumonia. On the other hand, 70% of lung cancer is characterized by a solitary pulmonary nodule, and about 20% of the solitary pulmonary nodule observed on the x-ray radiograph is finally diagnosed as the lung cancer. Radiographically, the most important thing for determining whether the pulmonary nodule is benign or malignant is a volume doubling time of the pulmonary nodule. In general, the volume doubling time of a malignant nodule is significantly less than that of a benign nodule. According to research, it is known that the volume doubling time of a malignant nodule is within about 200 days, and the volume doubling time of a benign nodule is greater than 4 years. Therefore, to accurately determine whether a pulmonary nodule is benign or malignant, a follow up period of more than 1 to 2 years is needed. However, it is very important to accurately estimate the volume doubling time of the pulmonary nodule during the follow up period of several months after the pulmonary nodule is observed so as to alleviate the burden of patients or to avoid possibility of worsening.

In general, the volume doubling time is calculated by manually or automatically measuring the pulmonary nodule volume seen on a chest x-ray radiograph or CT radiograph. When the pulmonary nodule volume is required to be measured using the chest x-ray radiograph, the area of the pulmonary nodule projected to a 2-dimensional screen is measured, and then the 3-dimensional volume is analogized from the area of the pulmonary nodule. However, when the shape of the pulmonary nodule is not a sphere, it becomes difficult to accurately measure the volume of the pulmonary nodule. In addition, ribs may overlap the pulmonary nodule on the chest x-ray radiograph to deteriorate detection sensitivity of the pulmonary nodule. When using a CT radiograph, the accuracy of measuring the pulmonary nodule volume is relatively high, but the volume measurement error is still about 10%. When CT radiography is used, the volume measurement error is mainly caused by imperfect extraction of the pulmonary nodule border.

Although the method of measuring the pulmonary nodule volume using a chest x-ray radiograph or CT radiograph exists, a method of measuring the pulmonary nodule using dual-energy subtraction image has been developed. The dual-energy subtraction imaging technique selectively removes the x-ray absorption effect of bones or soft tissues by using x-ray attenuation difference between the bones and the soft tissues from two x-ray images taken by x-rays of which energy bands are different. Accordingly, in dual-energy subtraction images, rib shadows seen on the simple x-ray radiograph are removed to clearly reveal the pulmonary nodule and improve the volume measurement accuracy.

SUMMARY OF THE INVENTION

The present invention provides a method of accurately measuring a pulmonary nodule volume using a dual-energy subtraction image.

The present invention also provides a device for accurately measuring a pulmonary nodule volume using a dual-energy subtraction image.

According to an aspect of the present invention, there is provided a method of measuring a pulmonary nodule volume using a dual-energy subtraction image, the method including: (a) obtaining a dual-energy subtraction image of a chest; (b) setting a specific region including a pulmonary nodule region in the obtained dual-energy subtraction image; (c) interpolating a gray level trend of a region surrounding the pulmonary nodule region into the pulmonary nodule region using a fitting function; and (d) measuring the pulmonary nodule volume by subtracting the interpolation result from the gray level data of the pulmonary nodule region.

In the above aspect of the present invention, (a) includes: (a1) obtaining high and low energy chest x-ray images; and (a2) removing x-ray absorption effect of bone tissues from the obtained images.

In addition, (c) includes: (c1) finding borders of the pulmonary nodule region in the specific region; (c2) selecting the fitting function and fitting data to interpolate the gray level trend of the region surrounding the pulmonary nodule region into the pulmonary nodule region; and (c3) correcting a deviation of the fitting result from the gray level at the border.

In addition, the fitting function may be a differentiable polynomial expression.

In addition, (c2) may be performed by using the Levenberg-Marquardt fitting method.

In addition, in (c3), when the deviation of the fitting result at the bordering point from the gray level is greater than a first predetermined value (GD1), the bordering point moves away from the center of the pulmonary nodule by one or more pixels, and when the deviation is less than a second predetermined value (GD2), the bordering point moves toward the center of the pulmonary nodule by one or more pixels.

In addition, in (d), the sum of the values obtained by subtracting the gray level trend resulting from the interpolation from the original gray level data of the pulmonary nodule region for all of the pixels is set as the pulmonary nodule volume.

According to another aspect of the present invention, there is provided a device for measuring a pulmonary nodule volume using a dual-energy subtraction image, the device including: a dual-energy subtraction image obtaining unit obtaining a dual-energy subtraction image of a chest; a specific region setting unit setting a specific region including a pulmonary nodule region in the obtained dual-energy subtraction image; a pulmonary nodule region interpolating unit interpolating a gray level trend of a region surrounding the pulmonary nodule region in the specific region into the pulmonary nodule region using a fitting function; and an interpolation result subtraction and pulmonary nodule volume measurement unit measuring a pulmonary nodule volume by subtracting the interpolation result from the gray level data of the pulmonary nodule region.

In the above aspect of the present invention, the dual-energy subtraction image obtaining unit: obtains high and low energy chest x-ray images; and removes an x-ray absorption effect of bone tissues from the obtained images.

In addition, the pulmonary nodule region interpolating unit: finds the border of the pulmonary nodule region in the specific region; selects the fitting function for interpolating the gray level trend of the region surrounding the pulmonary nodule region into the pulmonary nodule region and fits data; and corrects the border according to the deviation of the fitting result at the border from the gray level.

In addition, the fitting function may be a differentiable polynomial expression.

In addition, the fitting may be performed using the Levenberg-Marquardt fitting method.

In addition, in the process of correcting the border, when the deviation of the fitting result at the bordering point from the gray level is greater than a first predetermined value (GD1), the bordering point moves away from the center of the pulmonary nodule by one or more pixels, and when the deviation is less than a second predetermined value (GD2), the bordering point moves toward the center of the pulmonary nodule by one or more pixels.

In addition, the interpolation result subtraction and pulmonary nodule volume measurement unit sets the sum of the values obtained by subtracting the gray level trend resulting from the interpolation from the original gray level data of the pulmonary nodule region for all of the pixels as the pulmonary nodule volume.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
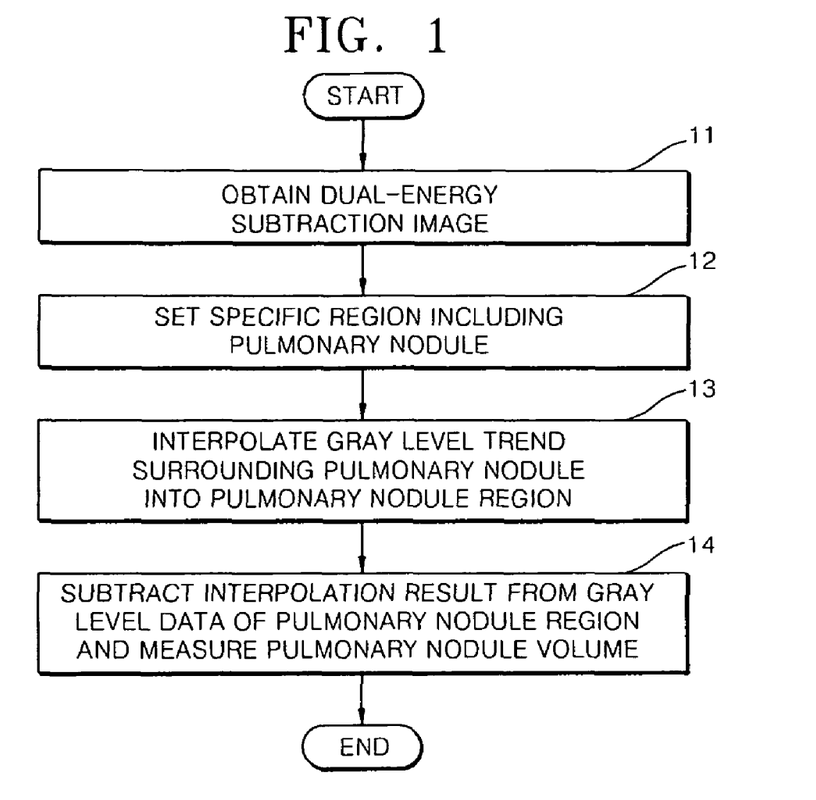
FIG. 1 is a flowchart illustrating a method of measuring a pulmonary nodule volume using a dual-energy subtraction image according to an exemplary embodiment of the present invention.

Hereinafter, the present invention will be described in detail by explaining embodiments of the invention with reference to the attached drawings. FIG. 1 is a flowchart illustrating a method of measuring a pulmonary nodule volume using a dual-energy subtraction image according to an exemplary embodiment of the present invention.

Referring to FIG. 1, according to the current embodiment of the present invention, a dual-energy subtraction image of a chest is obtained at first (process 11).

The dual-energy subtraction image can be obtained using a known dual-energy subtraction imaging device. The dual-energy subtraction imaging device can provide an approximately constant subtraction image with respect to the same part of a body, because the x-ray radiation conditions are stable. In general, the dual-energy subtraction imaging device sequentially irradiates two different x-rays of high and low energy respectively to a part of a body, obtains the high and low energy x-ray images, and can selectively remove the x-ray absorption effect of bones or soft tissues by using x-ray attenuation differences between the bones and the soft tissues from the obtained x-ray images.

Figure 2:
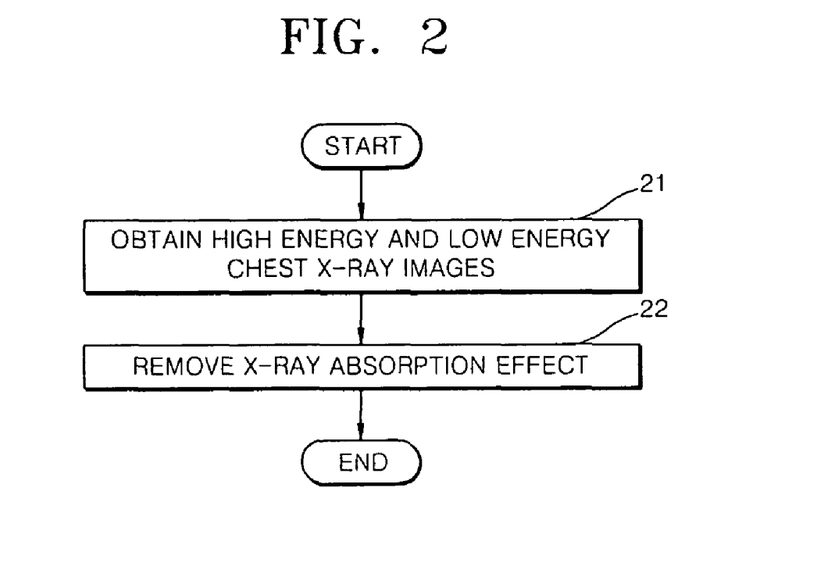
FIG. 2 is a flowchart illustrating a process of obtaining the dual energy subtraction image of FIG. 1 according to an exemplary embodiment of the present invention.

FIG. 2 is a flowchart illustrating a process of obtaining the dual energy subtraction image of FIG. 1 according to an exemplary embodiment of the present invention. Referring to FIG. 2, the process of obtaining the dual-energy subtraction image includes a process of obtaining high and low energy chest x-ray images (process 21) and a process of removing the x-ray absorption effect of bone tissues from the obtained images (process 22).

Figure 3A:
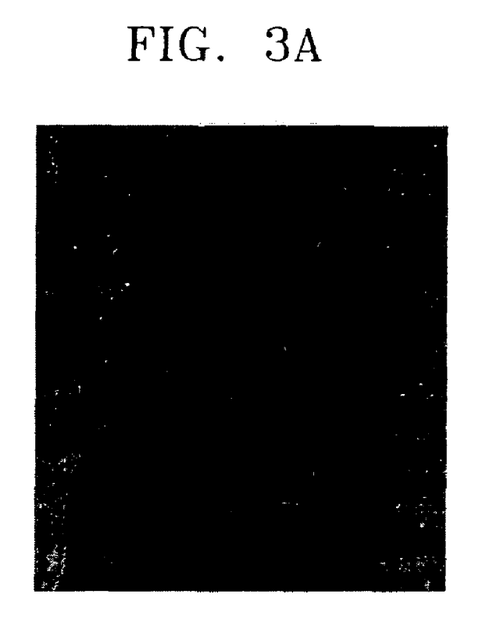
FIG. 3A is an example of an image showing a high energy chest x-ray radiograph obtained in the process of obtaining a chest x-ray image of FIG. 2.
Figure 3B:
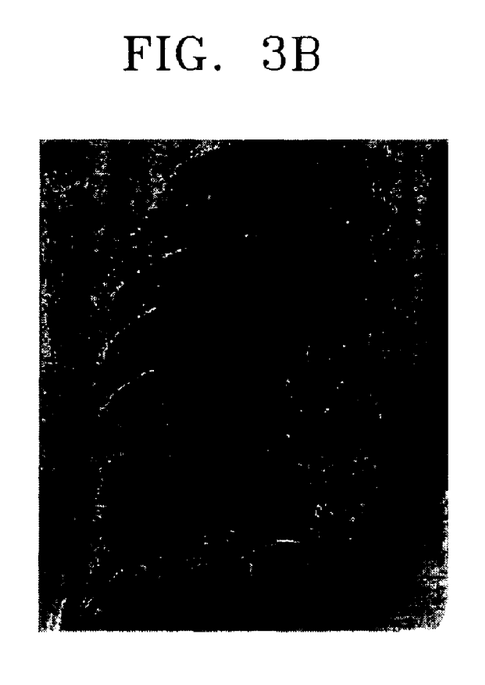
FIG. 3B is an example of an image showing a low energy chest x-ray radiograph obtained in the process of obtaining the chest x-ray image of FIG. 2.

FIGS. 3A and 3B show examples of high and low energy chest x-ray images obtained in the process of obtaining a chest x-ray image (process 21).

To obtain the images of FIGS. 3A and 3B, the dual-energy subtraction imaging device uses a tube voltage of 110 kVp and a tube current of 120 mA in the high energy band and uses a tube voltage of 60 kVp and a tube current of 200 mA in the low energy band. In each energy band, the x-ray is irradiated for 0.2 seconds, and the irradiation interval between the energy bands is 0.2 seconds. In addition, a space resolution of the subtraction imaging device is 0.14 mm per pixel, and the gray level of the image is 4096 (12-bit) level.

Figure 4A:
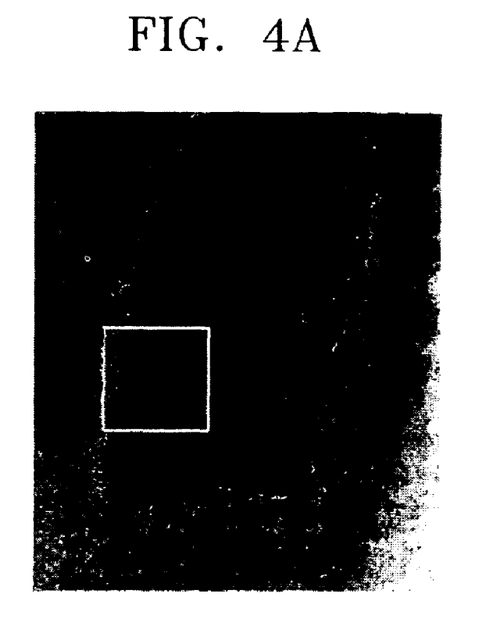
FIG. 4A is an example of an image obtained by removing the x-ray absorption effect of bone tissues which is obtained in the process of removing the x-ray absorption effect in FIG. 2.
Figure 4B:
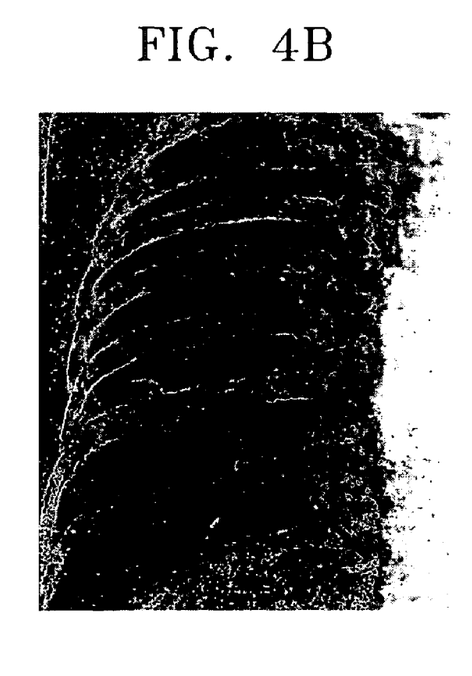
FIG. 4B is an example of an image obtained by removing x-ray absorption effect of soft tissues which is obtained in the process of removing the x-ray absorption effect in FIG. 2.

FIGS. 4A and 4B are examples of images obtained by removing x-ray absorption effects of bone tissues and soft tissues obtained in the x-ray absorption effect removing process of FIG. 2 (process 22), respectively.

A known dual-energy x-ray absorptiometry (DEXA) algorithm is used to obtain the images of FIGS. 4A and 4B. Referring to FIG. 4A, the pulmonary nodule is clearly seen on the image obtained by removing the x-ray absorption effect of the bone tissues since the shadows of the ribs are removed.

Each pixel of the image obtained by removing the x-ray absorption effect of the bone tissues through the process of the dual-energy subtraction imaging has a gray level related to an amount of the x-ray absorbed by the soft tissues. On the other hand, the x-ray attenuation characteristic of the pulmonary nodule located in a lung tissue is similar to that of the soft tissue. The x-ray is nearly not attenuated in the surrounding lung tissues because air fills the surrounding lung tissues. Accordingly, in the image obtained by removing the x-ray absorption effect of the bone tissues through the process of the dual-energy subtraction imaging, the pulmonary nodule region is brighter than the surrounding area in gray levels, and the gray level difference is directly related to the thickness of the pulmonary nodule. Thus, when the pulmonary nodule region is accurately separated and the gray level difference between the surrounding region and the pulmonary nodule region is measured, the volume index of the pulmonary nodule can be calculated.

Referring to FIG. 1 again, in the method of measuring the pulmonary nodule volume using the dual-energy subtraction image, a specific region that includes the pulmonary nodule region is set up in the obtained dual-energy subtraction image (process 12).

Setting the specific region may be performed using the dual-energy subtraction image obtained by removing the x-ray absorption effect of the bone tissues. In addition, the size of the specific region may be set up so that the specific region includes the whole pulmonary nodule region and the region surrounding the pulmonary nodule region sufficiently includes the soft tissue region. For example, the specific region may be set to be the square region of FIG. 4A, and the size of the specific region is 300×300 pixels.

Referring to FIG. 1 again, in the method of measuring the pulmonary nodule volume using the dual-energy subtraction image, a gray level trend of the surrounding region of the pulmonary nodule within the specific region is interpolated into the pulmonary nodule region using a fitting function (process 13).

In general, the pulmonary nodule has an x-ray absorption characteristic similar to that of the common soft tissues, and the lung mainly contains air, so the x-ray is rarely absorbed. Accordingly, the x-ray is largely absorbed in the pulmonary nodule part in the dual-energy subtraction image obtained by removing the x-ray absorption effect of the bone tissues, which in turn, generates gray level difference. In the interpolating process (process 13), when it is assumed that the pulmonary nodule region is replaced with the lung tissues surrounding the pulmonary nodule region, an aspect of the gray level of the lung tissues is obtained from the dual-energy subtraction image.

Figure 5:
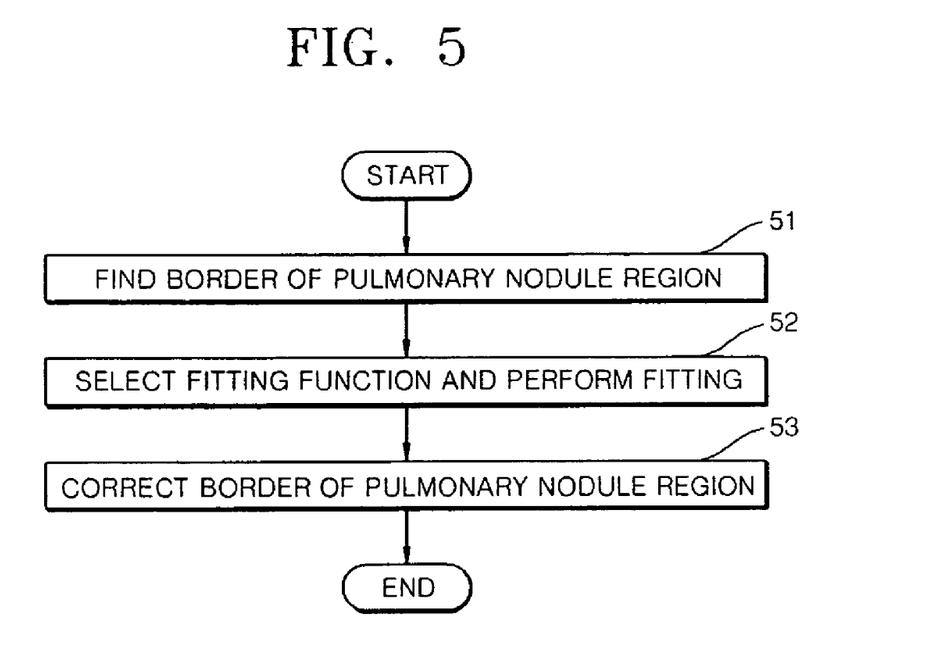
FIG. 5 is a flowchart illustrating a process of interpolating a pulmonary nodule region of FIG. 1 according to an exemplary embodiment of the present invention.

FIG. 5 is a flowchart illustrating a process of interpolating the pulmonary nodule region of FIG. 1 according to an exemplary embodiment of the present invention.

Referring to FIG. 5, in the interpolating process (process 13 of FIG. 1), the border of the pulmonary nodule region is found in the specific region (process 51). To find the border of the pulmonary nodule region, a transversal line may be set up in the specific region. The regions at which the slope variation or slope roughness of the gray level profile is greatest in the left and right sides of the transversal line are set to as the left and right borders of the pulmonary nodule.

Figure 6:
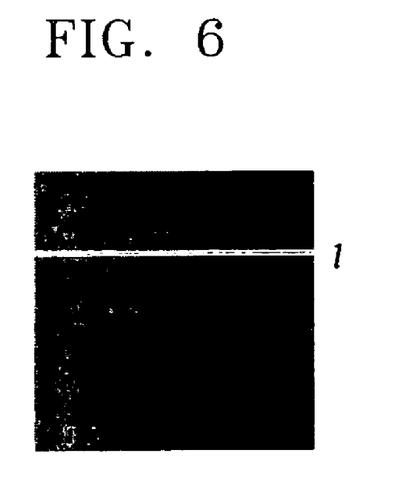
FIG. 6 is an image which is obtained by enlarging a square part of FIG. 4A.

FIG. 6 is an image obtained by enlarging the square part of FIG. 4A. Referring to FIG. 6, to find the border of the pulmonary nodule, a transversal line /is set up in the specific region.

Figure 7:
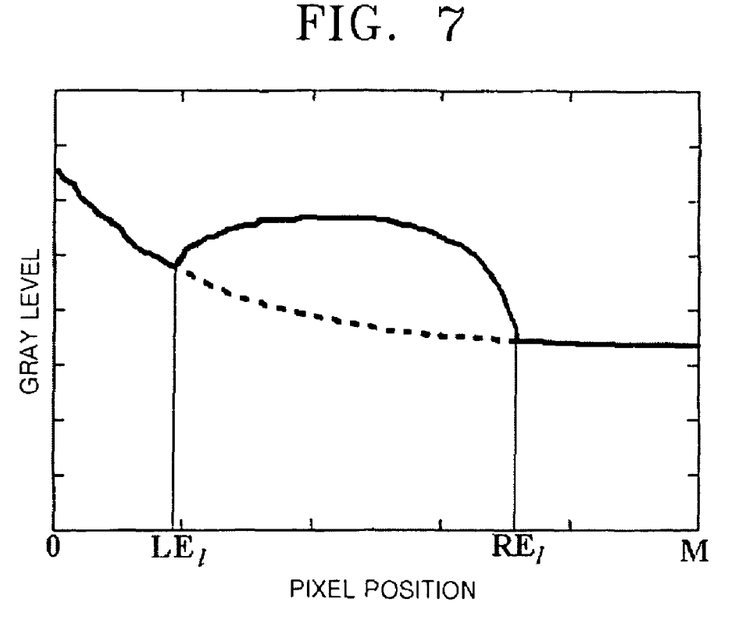
FIG. 7 shows an example of a profile of gray level on the transversal line of FIG. 6.

FIG. 7 shows an example of a profile of gray level along a transversal line of FIG. 6. Referring to FIG. 7, the gray level profile corresponding to the transversal line is schematically shown, and the left and right borders of the pulmonary nodule region are represented as $LE_l$ and $RE_l$. For convenience, a coordinate of the first pixel of the specific region is set to 0, and a coordinate of the final pixel is set to M.

Referring to FIG. 5 again, in the interpolating process, the fitting function is selected, and data is fitted using the fitting function to interpolate the gray level trend of the surrounding region of the pulmonary nodule region into the pulmonary nodule region (process 52).

The fitting function may be a differentiable polynomial. According to an exemplary embodiment of the present invention, a zero to fourth order polynomial such as $P(x)=C_0+C_1x+C_2x^2+C_3x^3+C_4x^4$ is used as the fitting function. In the aforementioned equation, $C_0$, $C_1$, $C_2$, $C_3$, and $C_4$ are fitting parameters. The interpolation is a process of expanding the gray level data of the external sections (0~$LE_l$ and $RE_l$~M) out of the pulmonary nodule into the pulmonary nodule region ($LE_l$~$RE_l$). When the data of the external region is fitted using the fitting function, the gray level data of the pulmonary nodule region is determined according to the fitting result.

The process of fitting the gray level data in external sections to the fitting function is performed according to the Levenberg-Marquardt fitting method. The interpolation result is represented with a dotted line in FIG. 7.

Referring to FIG. 5 again, in the interpolating process (process 13), the borders are corrected according to the deviation of the fitting result from the gray level at the border (process 53).

Figure 8:
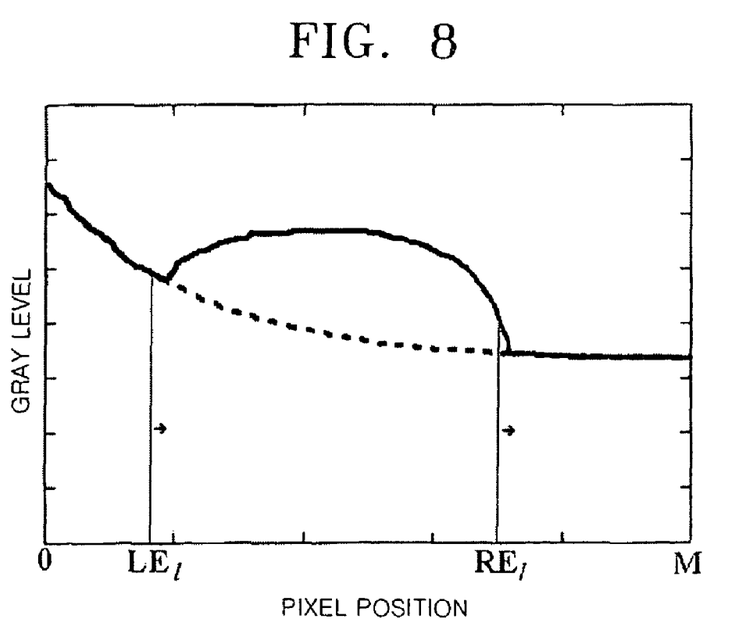
FIG. 8 shows an example of a process correcting an error at the pulmonary nodule border along the transversal line of FIG. 7.

FIG. 8 shows an example of a process correcting an error at the pulmonary nodule border along the transversal line of FIG. 7.

Referring to FIG. 8, in the correction process (process 53), when the deviation of the fitting result (a dotted line) at the bordering point from the gray level (a solid line) is greater than a predetermined value (GD1), the bordering point moves away from the center of the pulmonary nodule by one or more pixels, and when the deviation is less than another predetermined value (GD2), the bordering point moves toward the center of the pulmonary nodule by one or more pixels.

Although GD1 and GD2 have to be determined dependent on the image in order to improve the performance of the present method, GD1 and GD2 may be set to twice the average deviations of the fitting result in the sections (0~$LE_l$ and $RE_l$~M) outside the pulmonary nodule from the gray level data, respectively.

The process of selecting a fitting function and fitting the gray level data (process 52) and the process of correcting the border of the pulmonary nodule region (process 53) are performed repeatedly on the transversal line /to complete correction of the bordering point and determine the final fitting function. In addition, while the transversal line /changes to all of the rows of the specific region, the gray level trend of the region surrounding the pulmonary nodule is interpolated into the pulmonary nodule region (process 13).

Referring to FIG. 1 again, in the method of measuring the pulmonary nodule volume using the dual-energy subtraction image, the pulmonary nodule volume is measured by subtracting the interpolation result from the gray level data of the pulmonary nodule region (process 14).

The value obtained by subtracting the gray level trend resulting from the interpolation from the original gray level data of the pulmonary nodule region in the dual-energy subtraction image obtained by removing the x-ray absorption effect of the bone tissues is proportional to the thickness of the pulmonary nodule. Accordingly, the pulmonary nodule volume is proportional to the sum of the values obtained by subtracting the gray level trend resulting from the interpolation from the original gray level data of the pulmonary nodule region within the finally corrected pulmonary nodule region. The pulmonary nodule volume is measured from the sum.

Figure 9:
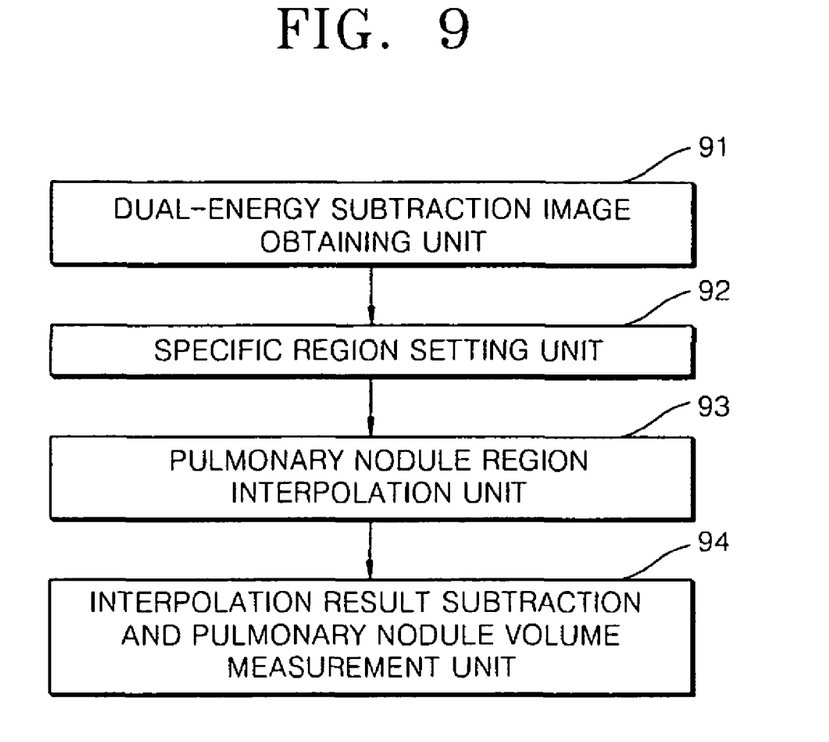
FIG. 9 is a block diagram illustrating a pulmonary nodule volume measurement device using a dual-energy subtraction image according to an embodiment of the present invention.

FIG. 9 is a block diagram illustrating a device for measuring a pulmonary nodule volume using a dual-energy subtraction image according to an embodiment of the present invention.

Referring to FIG. 9, the device for measuring the pulmonary nodule volume according to an embodiment of the present invention includes: a dual-energy subtraction image obtaining unit 91 for obtaining a dual-energy subtraction image of the chest; a specific region setting unit 92 for setting a specific region including the pulmonary nodule region in the obtained dual-energy subtraction image; a pulmonary nodule region interpolating unit 93 for interpolating the gray level trend of the region surrounding the pulmonary nodule region in the specific region into the pulmonary nodule region using the fitting function; and an interpolation result subtraction and pulmonary nodule volume measurement unit 94 for measuring the pulmonary nodule volume by subtracting the interpolation result from the gray level data of the pulmonary nodule region.

The dual-energy subtraction image obtaining unit 91 performs a process of obtaining high energy and low energy chest x-ray images and a process of removing the x-ray absorption effect of the bone tissues from the obtained images.

The pulmonary nodule region interpolation unit 93 performs: a process of finding the border of the pulmonary nodule region in the specific region; a process of selecting the fitting function for interpolating the gray level trend of the region surrounding the pulmonary nodule region into the pulmonary nodule region and fitting the gray level data; and a process of correcting the border according to the deviation of the fitting result at the border from the gray level.

The fitting function may be a differentiable polynomial. In addition, the fitting process may be performed using the Levenberg-Marquardt fitting method.

In the border correcting process, when the deviation of the fitting result at the bordering point from the gray level is greater than a predetermined value (GD1), the bordering point moves away from the center of the pulmonary nodule by one or more pixels, and when the deviation is less than another predetermined value (GD2), the bordering point moves toward the center of the pulmonary nodule by one or more pixels.

The interpolation result subtraction and pulmonary nodule volume measurement unit 94 can set the sum of the value obtained by subtracting the gray level trend resulting from the interpolation from the original gray level data of the pulmonary nodule region for all of the pixels as the pulmonary nodule volume.

As described above, according to an embodiment of the present invention, when it is desired to measure the pulmonary nodule volume using the dual-energy subtraction image, information on the thickness of the pulmonary nodule is obtained from the characteristic of the dual-energy subtraction image, and the pulmonary nodule volume is accurately measured by correcting the error at the border of the pulmonary nodule region using the fitting function.

The invention can also be embodied as computer readable codes on a computer readable recording medium. The computer readable recording medium is any data storage device that can store data which can be thereafter read by a computer device. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer devices so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of measuring a pulmonary nodule volume using a dual-energy subtraction image, the method comprising:
   (a) obtaining a dual-energy subtraction image of a chest;
   (b) setting a specific region comprising a pulmonary nodule region in the obtained dual-energy subtraction image;
   (c) interpolating a gray level trend of a region surrounding the pulmonary nodule region into the pulmonary nodule region using a fitting function; and
   (d) measuring the pulmonary nodule volume by subtracting the interpolation result from gray level data of the pulmonary nodule region,
   wherein (c) comprises:
      (c1) finding borders of the pulmonary nodule region in the specific region;
      (c2) selecting the fitting function and fitting the gray level data to interpolate the gray level trend of the region surrounding the pulmonary nodule region into the pulmonary nodule region; and
      (c3) correcting a deviation of the fitting result at the border from the gray level,
      wherein in (c3), when the deviation of the fitting result at the bordering point from the gray level is greater than a first predetermined value, the bordering point moves away from the center of the pulmonary nodule by one or more pixels, and when the deviation is less than a second predetermined value, the bordering point moves toward the center of the pulmonary nodule by one or more pixels.

2. The method of claim 1, wherein (a) comprises:
   (a1) obtaining high energy and low energy chest x-ray images; and
   (a2) removing an x-ray absorption effect of bone tissues from the obtained images.

3. The method of claim 1, wherein the fitting function is a differentiable polynomial expression.

4. The method of claim 1, wherein (c2) is performed by using the Levenberg-Marquardt fitting method.

5. The method of claim 1, wherein in (d), the sum of the value obtained by subtracting the gray level trend resulting from the interpolation from the original gray level data of the pulmonary nodule region for all of the pixels is set as the pulmonary nodule volume.

6. A device for measuring a pulmonary nodule volume using a dual-energy subtraction image, the device comprising:
- a dual-energy subtraction image obtaining unit obtaining a dual-energy subtraction image of a chest;
- a specific region setting unit setting a specific region comprising a pulmonary nodule region in the obtained dual-energy subtraction image;
- a pulmonary nodule region interpolating unit interpolating a gray level trend of a region surrounding the pulmonary nodule region in the specific region into the pulmonary nodule region using a fitting function; and
- an interpolation result subtraction and pulmonary nodule volume measurement unit measuring a pulmonary nodule volume by subtracting the interpolation result from gray level data of the pulmonary nodule region,
- wherein the pulmonary module region interpolating unit:
  - finds the borders of the pulmonary nodule region in the specific region;
  - selects the fitting function for interpolating the gray level trend of the region surrounding the pulmonary nodule region into the pulmonary nodule region and fitting the gray level data; and
  - corrects the border according to the deviation of the fitting result at the border from the gray level,
  - wherein, in correcting the border, when the deviation of the fitting result at the bordering point from the gray level is greater than a first predetermined value, the bordering point moves away from the center of the pulmonary nodule by one or more pixels, and when the deviation is less than a second predetermined value, the bordering point moves toward the center of the pulmonary nodule by one or more pixels.

7. The device of claim 6, wherein the dual-energy subtraction image obtaining unit:
- obtains high energy and low energy chest x-ray images; and
- removes an x-ray absorption effect of bone tissues from the obtained images.

8. The device of claim 6, wherein the fitting function is a differentiable polynomial expression.

9. The device of claim 6, wherein the fitting the gray level data is performed using the Levenberg-Marquardt fitting method.

10. The device of claim 6, wherein the interpolation result subtraction and pulmonary nodule volume measurement unit sets the sum of the value obtained by subtracting the gray level trend resulting from the interpolation from the original gray level data of the pulmonary nodule region for all of the pixels as the pulmonary nodule volume.

\* \* \* \* \*